United States Patent
Steinhardt

(10) Patent No.: US 9,183,463 B2
(45) Date of Patent: Nov. 10, 2015

(54) ORIENTATION MODEL FOR A SENSOR SYSTEM

(75) Inventor: Nico Steinhardt, Frankfurt (DE)

(73) Assignee: CONTINENTAL TEVES AG & CO., OHG, Frankfurt (DE)

(*) Notice: Subject to any disclaimer, the term of this patent is extended or adjusted under 35 U.S.C. 154(b) by 0 days.

(21) Appl. No.: 14/344,252

(22) PCT Filed: Sep. 12, 2012

(86) PCT No.: PCT/EP2012/067876
§ 371 (c)(1),
(2), (4) Date: Sep. 18, 2014

(87) PCT Pub. No.: WO2013/037853
PCT Pub. Date: Mar. 21, 2013

(65) Prior Publication Data
US 2015/0046020 A1    Feb. 12, 2015

(30) Foreign Application Priority Data

| Sep. 12, 2011 | (DE) | 10 2011 082 534 |
| Sep. 12, 2011 | (DE) | 10 2011 082 535 |
| Sep. 12, 2011 | (DE) | 10 2011 082 539 |
| Sep. 12, 2011 | (DE) | 10 2011 082 548 |
| Sep. 12, 2011 | (DE) | 10 2011 082 549 |
| Sep. 12, 2011 | (DE) | 10 2011 082 551 |
| Sep. 12, 2011 | (DE) | 10 2011 082 552 |
| Nov. 21, 2011 | (DE) | 10 2011 086 710 |
| May 2, 2012 | (DE) | 10 2012 207 297 |

(51) Int. Cl.
| G01S 19/47 | (2010.01) |
| G06K 9/62 | (2006.01) |
| G01C 21/16 | (2006.01) |
| G08C 19/24 | (2006.01) |

(Continued)

(52) U.S. Cl.
CPC ............ *G06K 9/624* (2013.01); *B60R 16/0231* (2013.01); *G01C 21/165* (2013.01);
(Continued)

(58) Field of Classification Search
CPC .. G01C 21/165; G01S 19/47; B60R 16/0231; B60T 2210/36; B60T 2250/06; G08C 19/24
USPC ........................................ 701/29.1
See application file for complete search history.

(56) References Cited

U.S. PATENT DOCUMENTS

| 7,801,644 B2 * | 9/2010 | Bruemmer et al. ........... 700/249 |
| 2007/0156286 A1 * | 7/2007 | Yamauchi ..................... 700/245 |

(Continued)

FOREIGN PATENT DOCUMENTS

| DE | 10 2006 029148 A1 | 1/2008 |
| DE | 10 2010 063984 A1 | 8/2011 |
| WO | WO 2005/062984 A2 | 7/2005 |
| WO | WO 2007/143806 A2 | 12/2007 |

OTHER PUBLICATIONS

International Search Report.

*Primary Examiner* — Richard Camby
(74) *Attorney, Agent, or Firm* — Brinks Gilson & Lione

(57) ABSTRACT

A sensor system for arrangement in a vehicle includes a plurality of sensor elements, a satellite navigation system, and a signal processing device. The signal processing device calculates and/or uses a first group of data of physical variables, whose values relate to a vehicle coordinate system, and calculates and/or uses a second group of data of physical variables, whose values relate to a world coordinate system, for describing the orientation and/or dynamic variables of the vehicle in the world.

12 Claims, 1 Drawing Sheet

(51) Int. Cl.
*B60R 16/023* (2006.01)
*G06K 9/00* (2006.01)

(52) U.S. Cl.
CPC ............ *G01S 19/47* (2013.01); *G06K 9/00503* (2013.01); *G08C 19/24* (2013.01); *B60T 2210/36* (2013.01); *B60T 2250/06* (2013.01)

(56) References Cited

U.S. PATENT DOCUMENTS

2007/0198145 A1* 8/2007 Norris et al. .................... 701/23
2010/0106356 A1 4/2010 Trepagnier et al.

* cited by examiner

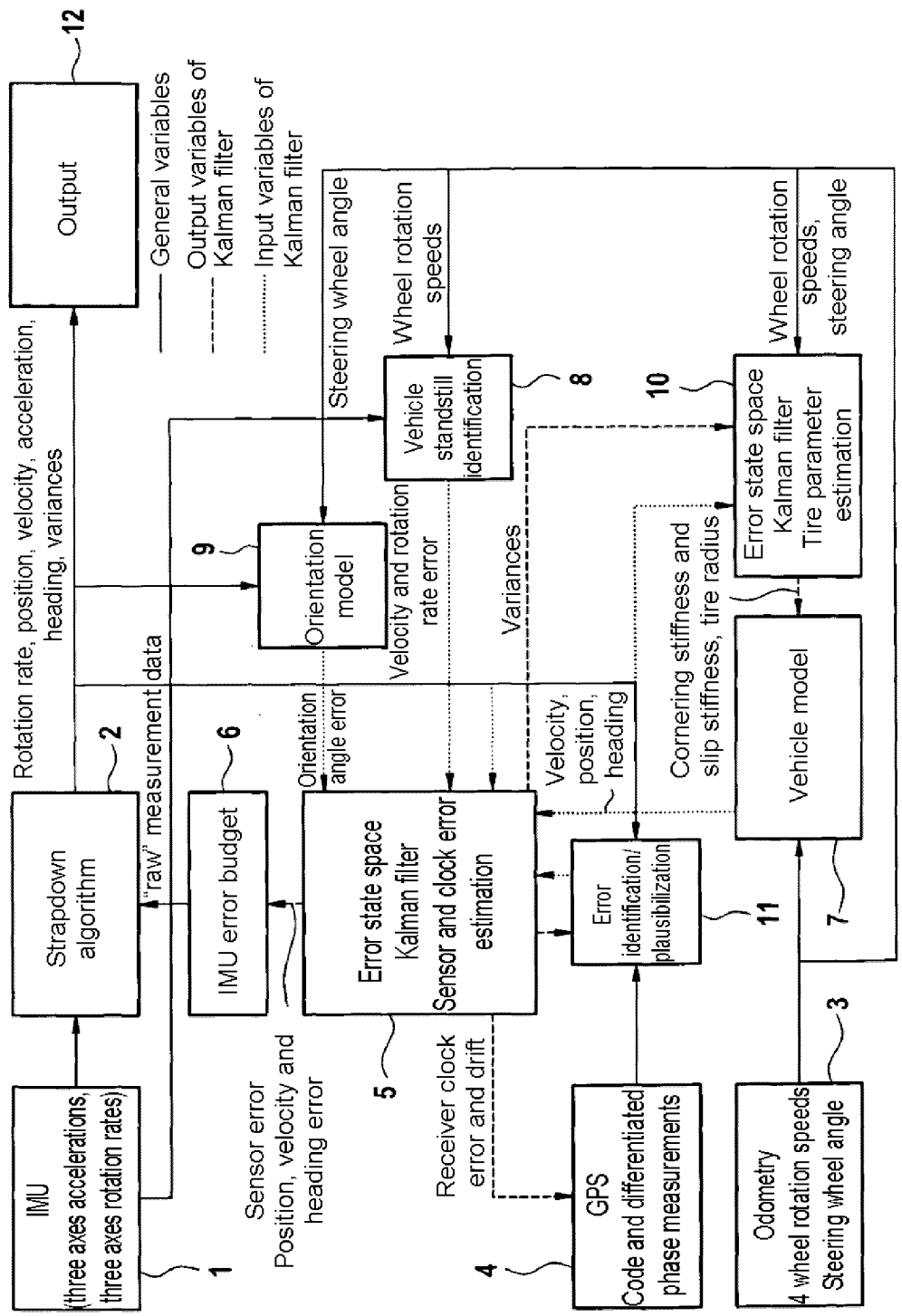

ORIENTATION MODEL FOR A SENSOR SYSTEM

CROSS REFERENCE TO RELATED APPLICATIONS

This application claims priority to German Patent Application Nos. 10 2011 082 534.7, filed Sep. 12, 2011; 10 2011 082 535.5, filed Sep. 12, 2011; 10 2011 082 539.8, filed Sep. 12, 2011; 10 2011 082 548.7, filed Sep. 12, 2011; 10 2011 082 549.5, filed Sep. 12, 2011; 10 2011 082 551.7, filed Sep. 12, 2011; 10 2011 082 552.5, filed Sep. 12, 2011; 10 2011 086 710.1, filed Nov. 21, 2011; 10 2012 207 297.7, filed May 2, 2012; and PCT/EP2012/067876, filed Sep. 12, 2012.

FIELD OF THE INVENTION

The invention relates to a sensor system in accordance with the preamble of claim 1 and to the use thereof in motor vehicles, in particular in automobiles.

BACKGROUND

Laid-open specification DE 10 2010 063 984 A1 describes a sensor system, comprising a plurality of sensor elements and a signal processing device, wherein the signal processing device is configured in such a way that the output signals from the sensor elements are evaluated jointly.

SUMMARY AND INTRODUCTORY DESCRIPTION OF THE INVENTION

The invention is based on the object of proposing a sensor system which provides or enables a relatively high degree of accuracy with respect to its signal processing.

This object is achieved by the sensor system as claimed in claim 1.

Expediently, the sensor system is arranged in a vehicle, such as an automobile.

The vehicle coordinate system and/or the world coordinate system are in the form of three-axis Cartesian coordinate systems. In this case, the vehicle coordinate system is defined in particular such that the first axis is the longitudinal axis of the vehicle, the second axis is the transverse axis of the vehicle and the third axis is the vertical axis of the vehicle.

The orientation angle between the vehicle coordinate system and the world coordinate system may be calculated in the orientation model unit at least on the basis of the following variables: the velocity with respect to the vehicle coordinate system, the velocity with respect to the world coordinate system, and in particular the steering angle.

The signal processing device may comprise a sensor fusion module, which has a fusion filter, which, over the course of the common evaluation of at least the sensor signals and/or signals of the sensor elements derived therefrom, provides a defined fusion data set, wherein this fusion data set has in each case data relating to defined physical variables, wherein the fusion data set relating to at least one physical variable comprises a value of this physical variable and information on the data quality thereof, and wherein the fusion filter is designed in such a way that the fusion data set comprises, as the value of the at least one physical variable, a relative value, in particular an offset value and/or change value and/or correction value and/or error value. The relative values of the respective physical variables of the fusion data may be set to be correction values, and the information on the data quality of the values of physical variables to be variances.

It is expedient for the sensor system to have an inertial sensor arrangement, comprising at least one acceleration sensor element and at least one rotation rate sensor element, and for the sensor fusion module to comprise a strapdown algorithm unit, in which a strapdown algorithm is implemented, with which at least the sensor signals of the inertial sensor arrangement are processed to give in particular corrected navigation data and/or driving dynamics data, on the basis of the vehicle in which the sensor system is arranged.

The orientation angle between the vehicle coordinate system and the world coordinate system may be calculated in the orientation model unit, in addition at least on the basis of one or more of the following variables: orientation information of the vehicle based on the world coordinate system, some or all of the correction values and/or variances of the fusion filter and/or the acceleration of the vehicle in relation to the vehicle coordinate system and/or the world coordinate system.

It is expedient for the orientation model unit to use some or all of the output data and/or output signals of the strapdown algorithm unit for the calculation.

The orientation model unit may be designed in such a way that, in addition to the orientation angle, it also calculates and provides information on the data quality of this variable, in particular the variance of the orientation angle, wherein the orientation model unit provides the orientation angle between the vehicle coordinate system and the world coordinate system and the information on the data quality of this variable to the fusion filter, and the fusion filter uses this orientation angle in its calculations and passes on the information on the data quality of this variable, in particular the variance of the orientation angle, to the strapdown algorithm unit.

It is expedient for the orientation model unit to be designed in such a way that, in addition to the orientation angle, it also calculates and provides information on the data quality of this variable, in particular the variance of the orientation angle, wherein the orientation angle is provided to the strapdown algorithm unit and/or is overwritten therein by the output value of the orientation model unit, and the information on the data quality of this variable, in particular the variance of the orientation angle, is provided to the fusion filter and/or is overwritten therein by the output value of the orientation model unit.

The sensor system may comprise a satellite navigation system, which is designed in such a way that it detects the distance data in each case between the assigned satellite and the vehicle or a variable dependent thereon and velocity information data in each case between the assigned satellite and the vehicle or a variable dependent thereon and provides these data or variables to the fusion filter, and the fusion filter uses these variables in its calculations.

The orientation model unit may be designed in such a way that it takes into consideration at least one or more or all of the following model assumptions in its calculations:

the total velocity of the vehicle with respect to at least its longitudinal and/or transverse axis is greater than zero, the average velocity of the vehicle in the direction of/along its vertical axis is equal to zero, there is no tire slip and/or the vehicle substantially follows its wheel steering angles without any deviations.

It is expedient for the orientation angle between the vehicle coordinate system and the world coordinate system to be calculated in the orientation model unit, additionally at least on the basis of one or more of the following variables: the wheel rotation speeds of wheel rotation speed sensor elements of the vehicle and the steering angle or the calculated wheel angle, wherein the rotation rate of the vehicle about its vertical axis is determined by the wheel rotation speeds and the steering angle or the wheel angles by means of difference formation and/or the rotation rate of the vehicle about its vertical axis on the basis of the vehicle coordinate system, provided by the strapdown algorithm unit.

The orientation angle between the vehicle coordinate system and the world coordinate system may be calculated in the orientation model unit additionally at least on the basis of one or more of the following variables: orientation information of the vehicle in relation to the world coordinate system, some or all of the correction values and/or variances of the fusion filter, position information of the vehicle in relation to the vehicle coordinate system and/or the world coordinate system, and/or the acceleration of the vehicle in relation to the vehicle coordinate system and/or the world coordinate system.

The orientation model unit may be designed in such a way that at least one of the following boundary conditions for the model validity is checked during each implementation and the results are discarded upon non-compliance:

the angle increments must be sufficiently small or be limited in order to be linearizable with a small error (Euler angles)

accelerations and kinematic constraints of the axles as a result of large steering locks have to be sufficiently small in order that the instantaneous pole of the movement is constant.

The orientation model unit is expediently designed in such a way that it carries out at least one of the following operations and/or steps:

Inclusion of wheel rotation speed measurements allows, by means of difference formation, the determination of the desired rate of rotation about the vertical axis which, together with the actual rate of rotation from the strapdown algorithm unit, supplies an additional measured variable, Direct correction of the skew or of the orientation angle in the strapdown algorithm unit between vehicle-fixed and navigation coordinates or between the vehicle coordinate system and the world coordinate system in the case of large deviations using at least one or all of Euler's equations.

The fusion filter is may be in the form of a Kalman filter, alternatively a particle filter or alternatively an information filter or alternatively in the form of an "unscented" Kalman filter.

The fusion filter may be designed in such a way that the fusion data set comprises, as value of the at least one physical variable, a relative value, in particular an offset value and/or change value and/or correction value and/or error value.

It is expedient for the relative values of the respective physical variables of the fusion data set to be correction values, to each of which scattering information or scattering or scattering degree, in particular a variance, is assigned as information relating to the data quality of said correction values.

The fusion filter may be designed in such a way that the value of at least one physical variable of the fusion data set is calculated on a direct or indirect basis from sensor signals from a plurality of sensor elements, wherein these sensor elements detect this at least one physical variable in a direct or indirect manner, with redundancy. This redundant detection may be implemented as direct or parallel redundancy and/or as analytical redundancy, from computationally derived or deduced variables/values and/or model assumptions.

The fusion filter may be in the form of a Kalman filter which iteratively implements at least prediction steps and correction steps and at least partially provides the fusion data set. In particular, the fusion filter is in the form of an error state space extended sequential Kalman filter, i.e. in the form of a Kalman filter which may comprise linearization and in which error state information is calculated and/or estimated and/or which operates sequentially and in the process uses/takes into consideration the input data available in the respective function step of the sequence.

It is expedient for the sensor system to have an inertial sensor arrangement, comprising at least one acceleration sensor element and at least one rotation rate sensor element, and for the sensor system to comprise a strapdown algorithm unit, in which a strapdown algorithm is implemented, with which at least the sensor signals of the inertial sensor arrangement relating to in particular corrected navigation data and/or driving dynamics data are processed, on the basis of the vehicle in which the sensor system is arranged.

The strapdown algorithm unit to may provide its calculated navigation data and/or driving dynamics data to the fusion filter directly or indirectly.

The sensor system may have an inertial sensor arrangement, which is designed in such a way that it can detect at least the acceleration along a second defined axis, in particular the transverse axis of the vehicle, and at least the rotation rate about a third defined axis, in particular the vertical axis of the vehicle, wherein the first and third defined axes form a generating system, and in the process are in particular oriented perpendicular to one another, wherein the sensor system also has at least one wheel rotation speed sensor element, in particular at least or precisely four wheel rotation speed sensor elements, which detect the wheel rotation speed of a wheel or the wheel rotation speeds of in each case one of the wheels of the vehicle and in particular additionally detect the direction of rotation of the assigned wheel of the vehicle in which the sensor system is arranged, wherein the sensor system additionally comprises at least one steering angle sensor element, which detects the steering angle of the vehicle, and wherein the sensor system furthermore comprises a satellite navigation system, which is designed in particular in such a way that it detects and/or provides the distance data in each case between the assigned satellite and the vehicle or a variable dependent thereon and velocity information data in each case between the assigned satellite and the vehicle or a variable dependent thereon.

The inertial sensor arrangement may be designed in such a way that it can detect at least the accelerations along a first, a second and a third defined axis and at least the rotation rates about these first, second and third defined axes, wherein these first, second and third defined axes form a generating system, and in the process are in particular in each case oriented perpendicular to one another.

The inertial sensor arrangement may provide its sensor signals to the strapdown algorithm unit and for the strapdown algorithm unit to be designed in such a way that it at least calculates and/or provides at least corrected accelerations along the first, the second and the third defined axes, at least corrected rotation rates about these three defined axes, at least a velocity with respect to these three defined axes, and at least one position variable, as measured variables and/or navigation data and/or driving dynamics data from the sensor signals of the inertial sensor arrangement and in particular at least fault state information and/or variance and/or information on the data quality which is assigned to a sensor signal or a physical variable and is provided by the fusion filter.

It is expedient for the sensor system to be designed in such a way that in each case at least one sensor signal and/or a physical variable, as direct or derived variable of the inertial sensor arrangement and/or the strapdown algorithm unit, of the wheel rotation speed sensor elements and the steering angle sensor element, in particular indirectly via a vehicle model unit, and of the satellite navigation system, in this case in particular distance data in each case between the assigned satellite and the vehicle or a variable dependent thereon and velocity information data in each case between the assigned satellite and the vehicle or a variable dependent thereon, are provided to the fusion filter and taken into consideration by the fusion filter in the calculations it performs.

The vehicle model unit may be designed in such a way that the speed along the first defined axis, the speed along the second defined axis and the rotation rate about the third defined axis are calculated from the sensor signals of the rotation speed sensor elements and the steering angle sensor element.

The vehicle model unit may be designed in such a way that, for the calculation, a least-squared-error method is used for solving an overdetermined system of equations.

The vehicle model unit may be designed in such a way that, in its calculation, it takes into consideration at least the following physical variables and/or parameters
a) the steering angle of each wheel, in particular detected by the steering angle sensor for the two front wheels, wherein the model assumption whereby the steering angle of the rear wheels is equal to zero or the steering angle of the rear wheels is additionally detected is used,
b) the wheel rotation speed or a variable dependent thereon for each wheel,
c) the rotation direction of each wheel,
d) the dynamic radius and/or wheel diameter of each wheel, and
e) the track width of each axle of the vehicle and/or the wheelbase between the axles of the vehicle.

The signal processing device may be designed in such a way that the fusion filter calculates and/or provides and/or outputs the fusion data set at defined times.

The fusion filter may be designed in such a way that it calculates and/or provides and/or outputs the fusion data set independently of the sampling rates and/or sensor signal output times of the sensor elements, in particular the wheel rotation speed sensor elements and the steering angle sensor element, and independently of temporal signal or measured variable or information output times of the satellite navigation system.

It is expedient for the signal processing device to be designed in such a way that, over the course of a function step of the fusion filter, the newest information and/or signals and/or data available to the fusion filter of the sensor elements, in particular of the wheel rotation speed sensor elements and the steering angle sensor element, are always updated, in particular asynchronously, directly or indirectly, in particular by means of the vehicle model unit and the satellite navigation system directly or indirectly, sequentially and/or are recorded by the fusion filter and taken into consideration in the calculation of the assigned function step of the fusion filter.

The sensor system may have a standstill identification unit, which is designed in such a way that it can identify a standstill of the vehicle and, in the event of an identified standstill of the vehicle, provides information from a standstill model at least to the fusion filter, in this case in particular the information that the rotation rates about all of the three axes have the value zero and at least one position change variable likewise has the value zero and in particular the velocities along all three axes have the value zero.

The signal processing device may calculate and/or use a first group of data of physical variables, whose values relate to a vehicle coordinate system, and wherein the signal processing device additionally calculates and/or uses a second group of data of physical variables, whose values relate to a world coordinate system, wherein this world coordinate system is suitable in particular at least for describing the orientation and/or dynamic variables of the vehicle in the world, wherein the sensor system has an orientation model unit, with which the orientation angle between the vehicle coordinate system and the world coordinate system is calculated, wherein the orientation angle between the vehicle coordinate system and the world coordinate system is calculated in the orientation model unit at least on the basis of the following variables: the velocity with respect to the vehicle coordinate system, the velocity with respect to the world coordinate system and in particular the steering angles.

It is expedient for the following terms to be used synonymously, i.e. have the same meaning when implemented technically: offset value, change value, correction value and error value.

Error state information may be understood to mean error information and/or error correction information and/or scattering information and/or variance information and/or accuracy information.

The term variance may be understood to mean scatter, wherein in particular in the case of a general fusion filter, said filter in each case assigns scatter or a scatter value to each value of a physical variable of the fusion filter, and in the case of a Kalman filter as the fusion filter, in each case a variance is assigned to each value of a physical variable of the fusion filter.

It is expedient for the first, second and third defined axes on the basis of a coordinate system of the vehicle in which the sensor system is implemented to be defined as follows: the first defined axis corresponds to the longitudinal axis of the vehicle, the second defined axis corresponds to the transverse axis of the vehicle, and the third defined axis corresponds to the vertical axis of the vehicle. These three axes in particular form a Cartesian coordinate system.

The fusion filter may be designed in such a way that its data, in particular the physical variables or the data of the physical variables of the fusion data set, are divided into blocks which always have a constant size and which are processed iteratively in any desired order in the fusion filter, i.e. the fusion filter implements a sequential update with respect to its input data. In this case, the fusion filter may be designed in such a way that the filter equations are matched, with the result that the computational result of the sequential update in each step of the fusion filter is an update, i.e. a data update, for all measured variables of the input data of the fusion filter.

The sensor system is expediently arranged in a vehicle, in particular in a motor vehicle, particularly preferably in an automobile.

The sensor system may be designed in such a way that data of the satellite navigation system, in particular position data, are assigned timestamp information, which substantially describes the measurement time of these data. The timestamp information of the respective datum of the satellite navigation system is provided jointly with this respective datum to the fusion filter and taken into consideration in the internal calculation in the fusion filter.

Such timestamp information may likewise assigned to the data of further or all of the sensor elements and/or the inertial sensor arrangement, which timestamp information is likewise provided with the respective datum to the fusion filter and is taken into consideration in the internal calculation in the fusion filter. Expediently, the respective timestamp information is generated by the satellite navigation system itself with respect to the data of the satellite navigation system.

The respective timestamp information may be generated by the signal processing device in the case of the additional timestamp information of the further sensor elements and/or the inertial sensor arrangement, in particular depending on the time measurement of the satellite navigation system.

A function step of the fusion filter may comprise at least one prediction step and a correction step. The fusion filter is in this case formed iteratively and performs iteratively, one after the other, function steps. In particular, data or values or signals are input within each function step of the fusion filter, i.e. input data are taken into consideration, i.e. data or values or signals are also output, i.e. provided as output data.

The fusion filter may be designed in such a way that the fusion filter implements a plurality of update steps within a function step, wherein these update steps relate to loading or use or updating of input data or signals. The fusion filter runs in particular sequentially through all of the input variables or input signals and checks in each case whether new information/data are present. If this is the case, this information or data is transferred into the filter or the information/data are updated in the filter, and if this is not the case the present value is maintained and the filter checks the next input or the next input variable or the next input signal.

The strapdown algorithm unit may provide at least absolute values of physical variables, in particular absolute values for the acceleration, the rotation rate, the velocity, in this case in each case in relation to the three axes, to the vehicle and/or world coordinate system, and a position and the orientation angle. The values with respect to these variables are in this case may be provided by the strapdown algorithm unit as corrected values/variables.

It is expedient for the inertial sensor arrangement to clock and/or trigger the fusion filter, in particular each fusion step which is implemented by the fusion filter is triggered by the inertial sensor arrangement or at least one output signal or output datum.

The strapdown algorithm unit may be designed in such a way that it has a start vector of physical variables and/or a start value of the position, in particular with respect to the start of the sensor system, particularly preferably after each time the sensor system is switched on. The strapdown algorithm unit particularly preferably receives this start vector and/or this start position via the fusion filter from the satellite navigation system.

It is expedient for the data of the fusion filter, in particular the fusion data set thereof, to image a virtual sensor or correspond to such a virtual sensor.

The term sensor elements is preferably understood to mean the wheel rotation speed sensor elements, the at least one steering angle sensor element, the sensor elements of the inertial sensor arrangement and in particular additionally also the satellite navigation system.

If, in general, a variable and/or value is specified in respect of the three defined axes, it is preferable for this to be intended with respect to the vehicle coordinate system and/or the world coordinate system.

It is expedient for the fusion data set, which comprises values of the physical variables, to comprise a relative value, for example a correction value, also referred to as offset value, and in particular to be provided to the strapdown algorithm unit. In accordance with the example, this respective correction value results in each case from the accumulated error values or change values which are provided by the fusion filter.

In addition, the invention relates to the use of the sensor system in vehicles, in particular motor vehicles, particularly preferably in automobiles.

BRIEF DESCRIPTION OF THE DRAWINGS

Further preferred embodiments result from the dependent claims and the description below relating to an exemplary embodiment with reference to FIG. 1.

FIG. 1 shows a schematic illustration of an exemplary embodiment of the sensor system, which is intended for arrangement and use in a vehicle. In this case, the sensor elements and the satellite navigation system as well as the most important signal processing units of the signal processing device are illustrated as function blocks and the interaction of said blocks with one another is also illustrated.

FURTHER DESCRIPTION OF THE INVENTION

The sensor system comprises an inertial sensor arrangement 1, IMU, "inertial measurement unit", which is designed in such a way that it can detect at least the accelerations along a first, a second and a third defined axis and at least the rotation rates about these first, second and third defined axes, wherein the first defined axis corresponds to the longitudinal axis of the vehicle, the second defined axis corresponds to the transverse axis of the vehicle, and the third defined axis corresponds to the vertical axis of the vehicle. These three axes form a Cartesian coordinate system, the vehicle coordinate system.

The sensor system has a strapdown algorithm unit 2, in which a strapdown algorithm is implemented, with which at least the sensor signals of the inertial sensor arrangement 1 are processed to give corrected navigation data and/or driving dynamics data. These output data of the strapdown algorithm unit 2 include the data of the following physical variables: the velocity, the acceleration and the rotation rate in each case of the vehicle, by way of example with respect to the three axes of the vehicle coordinate system and, in accordance with the example, additionally in each case in relation to a world coordinate system, which is suitable for describing the orientation and/or dynamic variables of the vehicle in the world. In addition, the output data of the strapdown algorithm unit 2 comprise the position with respect to the vehicle coordinate system and the orientation with respect to the world coordinate system. In addition, the output data of the strapdown algorithm unit have the variances as information on the data quality of the abovementioned physical variables, at least some of said variables. These variances, in accordance with the example, are not calculated in the strapdown algorithm unit, but are only used and passed on by said strapdown algorithm unit.

The output data of the strapdown algorithm unit are additionally, by way of example, the output data or signals 12 of the entire sensor system.

The sensor system additionally comprises wheel rotation speed sensor elements 3 for each wheel of the vehicle, in accordance with the example four, which detect the wheel rotation speeds of in each case one of the wheels of the vehicle and in each case additionally detect the direction of rotation, and additionally a steering angle sensor element 3, which detects the steering angle of the vehicle. The wheel rotation speed sensor element and the steering angle sensor element form a sensor arrangement 3 for odometry detection.

Furthermore, the sensor system has a satellite navigation system 4, which is designed in such a way that it detects and/or provides the distance data in each case between the assigned satellite and the vehicle or a variable dependent thereon and velocity information data in each case between the assigned satellite and the vehicle or a variable dependent thereon. In addition, the satellite navigation system 4, in accordance with the example, provides a start position or start position information, at least for starting or switching on the sensor system, to the fusion filter.

The signal processing device of the sensor system also comprises a fusion filter 5. The fusion filter 5 provides a defined fusion data set 6 over the course of the joint evaluation of at least the sensor signals and/or signals derived therefrom of the sensor elements 3, i.e. the odometry, and the output signals of the satellite navigation system 4 and/or signals derived therefrom. This fusion data set has in each case data with respect to defined physical variables, wherein the fusion data set 6 with respect to at least one physical variable comprises a value of this physical variable and information on its data quality, wherein this information on the data quality is expressed as variance, in accordance with the example.

The fusion data set 6 comprises, as value of the at least one physical variable, a relative value, for example a correction value, also referred to as offset value. In accordance with the example, the correction value results in each case from the accumulated error values or change values which are provided by the fusion filter 5.

The relative values of the respective physical variables of the fusion data set 6 are therefore correction values and variances, in accordance with the example. In other words, the fusion data set 6, in accordance with the example, calculates an error budget, which is provided as input variable or input data set to the strapdown algorithm unit and is taken into consideration at least partially by said strapdown algorithm unit in its calculations. This error budget comprises, as data set or output data, at least correction values or error values of physical variables and in each case a variance, as information on the data quality, with respect to each value. In this case, at least the correction values and variances with respect to the physical variables velocity, acceleration and rotation rate, in each case in relation to the vehicle coordinate system, i.e. in each case the three components of these variables with respect to this coordinate system, and IMU orientation or the IMU orientation angle between the vehicle coordinate system and the coordinate system or the installation orientation of the inertial sensor arrangement 1 and the position in relation to the world coordinate system are transmitted by the fusion filter to the strapdown algorithm unit.

The values of the physical variables of the fusion data set are calculated on a direct or indirect basis of the sensor signals of the sensor elements 3 and the satellite navigation system 4, wherein at least some variables, for example the velocity and the position of the vehicle with respect to the vehicle coordinates, are detected and used with redundancy with respect to the data of the strapdown algorithm unit 2.

The fusion filter 5 is, in accordance with the example, in the form of an error state space extended sequential Kalman filter, i.e. in the form of a Kalman filter which comprises in particular linearization and in which the correction values are calculated and/or estimated and which operates sequentially and in the process uses/takes into consideration the input data available in the respective function step of the sequence.

The fusion filter 5 is designed in such a way that, over the course of a function step of the fusion filter, the newest information and/or signals and/or data available to the fusion filter of the sensor elements 3, i.e. the wheel rotation speed sensor elements and the steering angle sensor element indirectly by means of a vehicle model unit 7 and of the satellite navigation system 4 directly or indirectly are always sequentially updated, asynchronously, and/or recorded in the fusion filter and taken into consideration in the calculation of the assigned function step of the fusion filter 5.

The vehicle model unit 7 is designed in such a way that it calculates, from the sensor signals of the wheel rotation speed sensor elements 3 and the steering angle sensor element 3, at least the velocity along a first defined axis, the velocity along a second defined axis, and the rotation rate about a third defined axis and provides these to the fusion filter 5.

The sensor system has, in accordance with the example, four wheel rotation speed sensor elements 3, wherein in each case one of the wheel rotation speed sensor elements is assigned to each wheel of the vehicle, wherein the vehicle model unit 7 is designed in such a way that it calculates, from the sensor signals of the wheel rotation speed sensor elements and the steering angle, provided by the steering angle sensor unit, and/or the steering angle of each wheel, in particular detected by the steering angle sensor element for the front wheels and by means of at least one further steering angle sensor element for the rear wheels or at least from a model assumption for the rear wheels, the velocity components and/or the velocity of each wheel, along/with respect to the first and second defined axes directly or indirectly, wherein, from these eight velocity components and/or the four velocities, in each case with respect to the first and second defined axes, the velocity along a first defined axis, the velocity along a second defined axis, and the rotation rate about a third defined axis are calculated.

The sensor system or the signal processing device of said sensor system also comprises a tire parameter estimation unit 10, which is designed in such a way that it calculates at least the radius, in accordance with the example the dynamic radius, of each wheel and additionally calculates the cornering stiffness and the slip stiffness of each wheel and provides these to the vehicle model unit 7 as additional input variables, wherein the tire parameter estimation unit 10 is designed in such a way that it uses a substantially linear tire model for calculating the wheel/tire variables. The input variables of the tire parameter estimation unit in accordance with the example are in this case the wheel rotation speeds 3 and the steering angle 3, at least partially or completely the output variables or values of the strapdown algorithm unit 2, in particular the variances provided thereby in addition to the values of the physical variables, and the variances of the fusion filter 5, with respect to the physical variables which are the input variables of the tire parameter estimation unit 10.

The sensor system or its signal processing device also comprises a GPS error identification and plausibilization unit 11, which is designed in such a way that, in accordance with the example, it receives, as input data, the output data or output signals of the satellite navigation system 4 and at least partially the output data or output signals of the strapdown algorithm unit 2 and takes these into consideration in its calculations.

In this case, the GPS error identification and plausibilization unit 11 is additionally connected to the fusion filter 5 and exchanges data therewith.

The GPS error identification and plausibilization unit 11 is designed, by way of example, in such a way that it implements the following method:

Method for selecting a satellite, comprising:
measuring measurement position data of the vehicle with respect to the satellite on the basis of the GNSS signal, i.e. the global navigation satellite system signal, the output signal or the output data of the satellite navigation system 4, determining reference position data of the vehicle which are redundant with respect to the measurement position data determined on the basis of the GNSS signal; and selecting the satellite when a comparison of the measurement position data and the reference position data satisfies a predetermined condition, wherein, in order to compare the measurement position data and the reference position data, a difference between the measurement position data and the reference position data is formed, wherein the predetermined condition is a maximum permissible error between the measurement position data and the reference position data, wherein the maximum permissible error is dependent on a standard deviation, which is calculated on the basis of a sum of a reference variance for the reference position data and a measurement variance for the measurement position data, wherein the maximum permissible error corresponds to a multiple of the standard deviation such that a probability that the measurement position data fall below a predetermined threshold value in a scatter interval which is dependent on the standard deviation.

The sensor system or its signal processing device also has a standstill identification unit 8, which is designed in such a way that it can identify a standstill of the vehicle and, in the event of an identified standstill of the vehicle, provides information from a standstill model at least to the fusion filter 5, in this case in particular the information that the rotation rates about all three axes have the value zero and at least one position change variable likewise has the value zero and in particular the velocities along all three axes have the value zero. The standstill identification unit 8 is in this case designed, in accordance with the example, in such a way that it uses the wheel rotation speeds or wheel rotation speed signals as input data and the "raw" or direct output signals of the inertial sensor arrangement 1.

The signal processing device calculates and/or uses, in accordance with the example, a first group of data of physical variables, whose values relate to a vehicle coordinate system and in addition calculates and/or uses a second group of data of physical variables, whose values relate to a world coordinate system, wherein this world coordinate system is suitable in particular at least for describing the orientation and/or dynamic variables of the vehicle in the world, wherein the sensor system has an orientation model unit 9, with which the orientation angle between the vehicle coordinate system and the world coordinate system is calculated.

The orientation angle between the vehicle coordinate system and the world coordinate system in the orientation model unit 9 is calculated at least on the basis of the following variables: the velocity with respect to the vehicle coordinate system, the velocity with respect to the world coordinate system and the steering angle.

The orientation angle between the vehicle coordinate system and the world coordinate system is calculated, in accordance with the example, in the orientation model unit 9 additionally at least on the basis of one or more of the following variables: orientation information of the vehicle based on the world coordinate system, some or all of the correction values and/or variances of the fusion filter and/or the acceleration of the vehicle in relation to the vehicle coordinate system and/or the world coordinate system.

The orientation model unit 9 uses some or all of the output data and/or output signals of the strapdown algorithm unit 2 for the calculation.

The orientation model unit 9 is designed, in accordance with the example, in such a way that it calculates and provides, in addition to the orientation angle, also information on the data quality of this variable, in particular the variance of the orientation angle, wherein the orientation model unit 9 provides the orientation angle between the vehicle coordinate system and the world coordinate system and the information on the data quality of this variable to the fusion filter 5, and the fusion filter uses this orientation angle in its calculations and particularly preferably passes on the information on the data quality on this variable, in particular the variance of the orientation angle, to the strapdown algorithm unit While the above description constitutes the preferred embodiment of the present invention, it will be appreciated that the invention is susceptible to modification, variation, and change without departing from the proper scope and fair meaning of the accompanying claims.

The invention claimed is:

1. A sensor system for arrangement in a vehicle, the sensor system comprising:
   a plurality of sensor elements configured to detect at least partly different primary measured variables and use at least partially different measurement principles,
   a satellite navigation system, and
   a signal processing device,
   the signal processing device is configured to evaluate that it evaluates the sensor signals of the sensor elements and the output signals of the satellite navigation system jointly at least partially directly or indirectly,
   the signal processing device calculates and/or uses a first group of data of physical variables, whose values relate to a vehicle coordinate system, and wherein the signal processing device calculates and/or uses a second group of data of physical variables, whose values relate to a world coordinate system, wherein this world coordinate system is suitable at least for describing the orientation and/or dynamic variables of the vehicle in the world,
   wherein the vehicle coordinate system is defined as having a longitudinal axis of the vehicle, a transverse axis of the vehicle and a vertical axis of the vehicle,
   wherein the world coordinate system defines an orientation and/or dynamic variables of the vehicle in the world.
   the sensor system has an orientation model unit, with which the orientation angle between the vehicle coordinate system and the world coordinate system is calculated.

2. The sensor system as claimed in claim 1, wherein the orientation angle between the vehicle coordinate system and the world coordinate system is calculated in the orientation model unit at least on the basis of the following variables:
   the velocity with respect to the vehicle coordinate system,
   the velocity with respect to the world coordinate system, and
   in particular the steering angle.

3. The sensor system as claimed in claim 1, wherein the signal processing device comprises a sensor fusion module, which has a fusion filter, which, over the course of the common evaluation of at least the sensor signals and/or signals of the sensor elements derived therefrom, provides a defined fusion data set, wherein this fusion data set has in each case data relating to defined physical variables, wherein the fusion data set relating to at least one physical variable comprises a value of this physical variable and information on the data quality thereof, and
   the fusion data set comprises, as the value of the at least one physical variable, a relative value, in particular an offset value and/or change value and/or correction value and/or error value.

4. The sensor system as claimed in claim 3, wherein the relative values of the respective physical variables of the fusion data set are correction values, and
the information on the data quality of the values of physical variables are variances.

5. The sensor system as claimed in claim 1, wherein the sensor system has an inertial sensor arrangement, comprising at least one acceleration sensor element and at least one rotation rate sensor element, and the sensor fusion module comprises a strapdown algorithm unit to process at least the sensor signals of the inertial sensor arrangement to provide navigation data and/or driving dynamics data, based on the vehicle in which the sensor system is arranged.

6. The sensor system as claimed in claim 2, wherein the orientation angle between the vehicle coordinate system and the world coordinate system is calculated in the orientation model unit, in addition at least on the basis of one or more of the following variables:
orientation information of the vehicle based on the world coordinate system,
some or all of the correction values and/or variances of the fusion filter and/or
the acceleration of the vehicle in relation to the vehicle coordinate system and/or the world coordinate system.

7. The sensor system as claimed in claim 5, wherein the orientation model unit uses some or all of the output data and/or output signals of the strapdown algorithm unit for the calculation.

8. The sensor system as claimed in claim 3, wherein the orientation model unit is configured to calculate and provide information on data quality of the variance of the orientation angle, wherein the orientation model unit provides the orientation angle between the vehicle coordinate system and the world coordinate system and the information on the data quality of this variable to the fusion filter, and the fusion filter uses this orientation angle in its calculations.

9. The sensor system as claimed in claim 3, wherein the orientation model unit is configured to calculate and provide information on the data quality of the variance of the orientation angle, wherein the orientation angle is provided to the strapdown algorithm unit and/or is overwritten therein by the output value of the orientation model unit, and the information on the data quality of this variable is provided to the fusion filter and/or is overwritten therein by the output value of the orientation model unit.

10. The sensor system as claimed in claim 3, wherein the sensor system comprises a satellite navigation system, which is configured to detect the distance data in each case between the assigned satellite and the vehicle or a variable dependent thereon and velocity information data in each case between the assigned satellite and the vehicle or a variable dependent thereon and provides these data or variables to the fusion filter, and the fusion filter uses these variables in its calculations.

11. The sensor system as claimed in claim 1, wherein the orientation model unit is configured to take into consideration at least one or more or all of the following model assumptions in its calculations:
a total velocity of the vehicle with respect to at least its longitudinal and/or transverse axis is greater than zero,
an average velocity of the vehicle in the direction of/along its vertical axis is equal to zero,
there is no tire slip and/or the vehicle substantially follows wheel steering angles without any deviations.

12. The sensor system as claimed in claim 2, wherein the orientation angle between a vehicle coordinate system and a world coordinate system is calculated in an orientation model unit, on the basis of one or more of the following variables:
a wheel rotation speeds of wheel rotation speed sensor elements of the vehicle and the steering angle or the calculated wheel angle, wherein a rotation rate of the vehicle about its vertical axis is determined by the wheel rotation speeds and the steering angle or the wheel angles by means of difference formation and/or the rotation rate of the vehicle about its vertical axis on the basis of the vehicle coordinate system, provided by the strapdown algorithm unit.

* * * * *